Jan. 29, 1929.
H. E. P. TAYLOR
ROLL GRINDER
Filed April 19, 1924
1,700,422
9 Sheets-Sheet 1
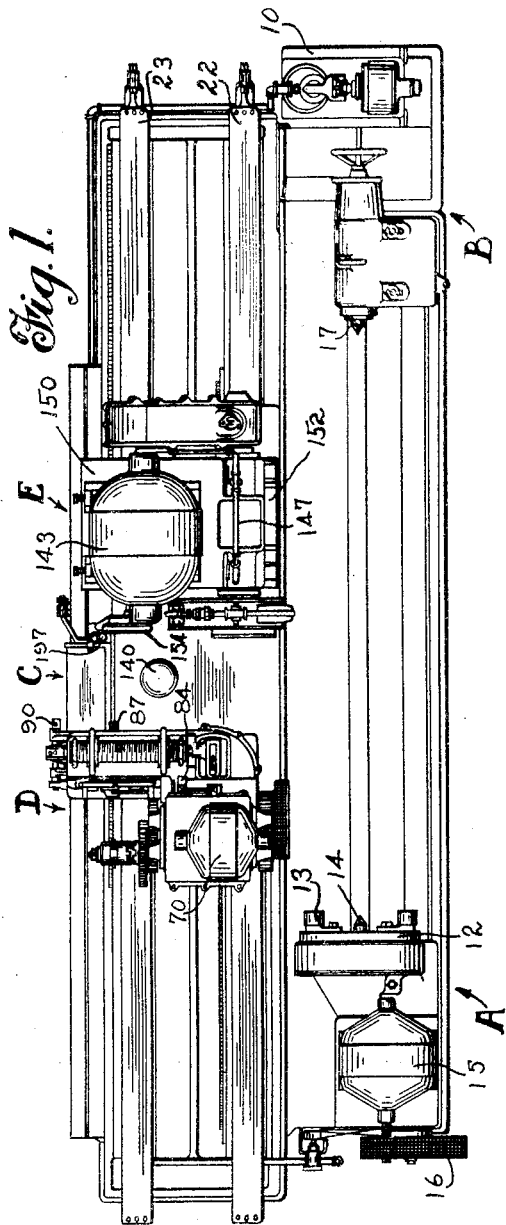
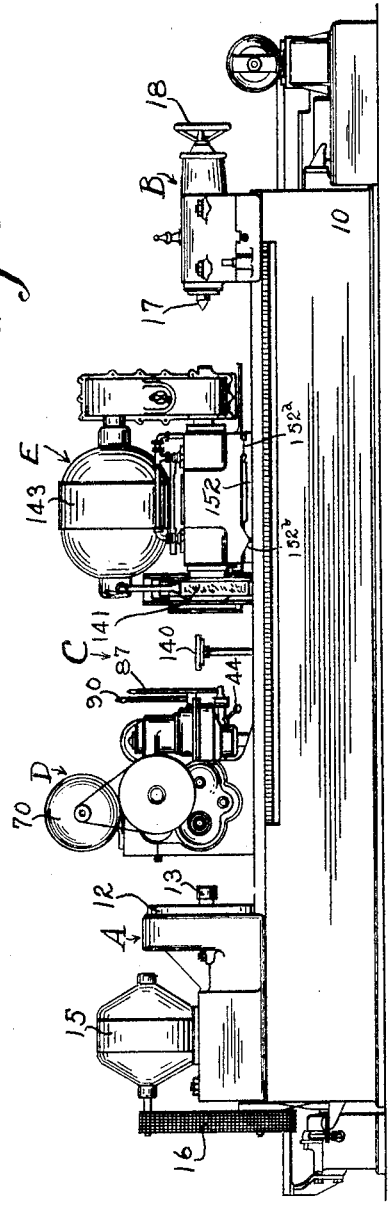
Inventor
Henry E. P. Taylor
By Henry E. Rockwell
Attorney

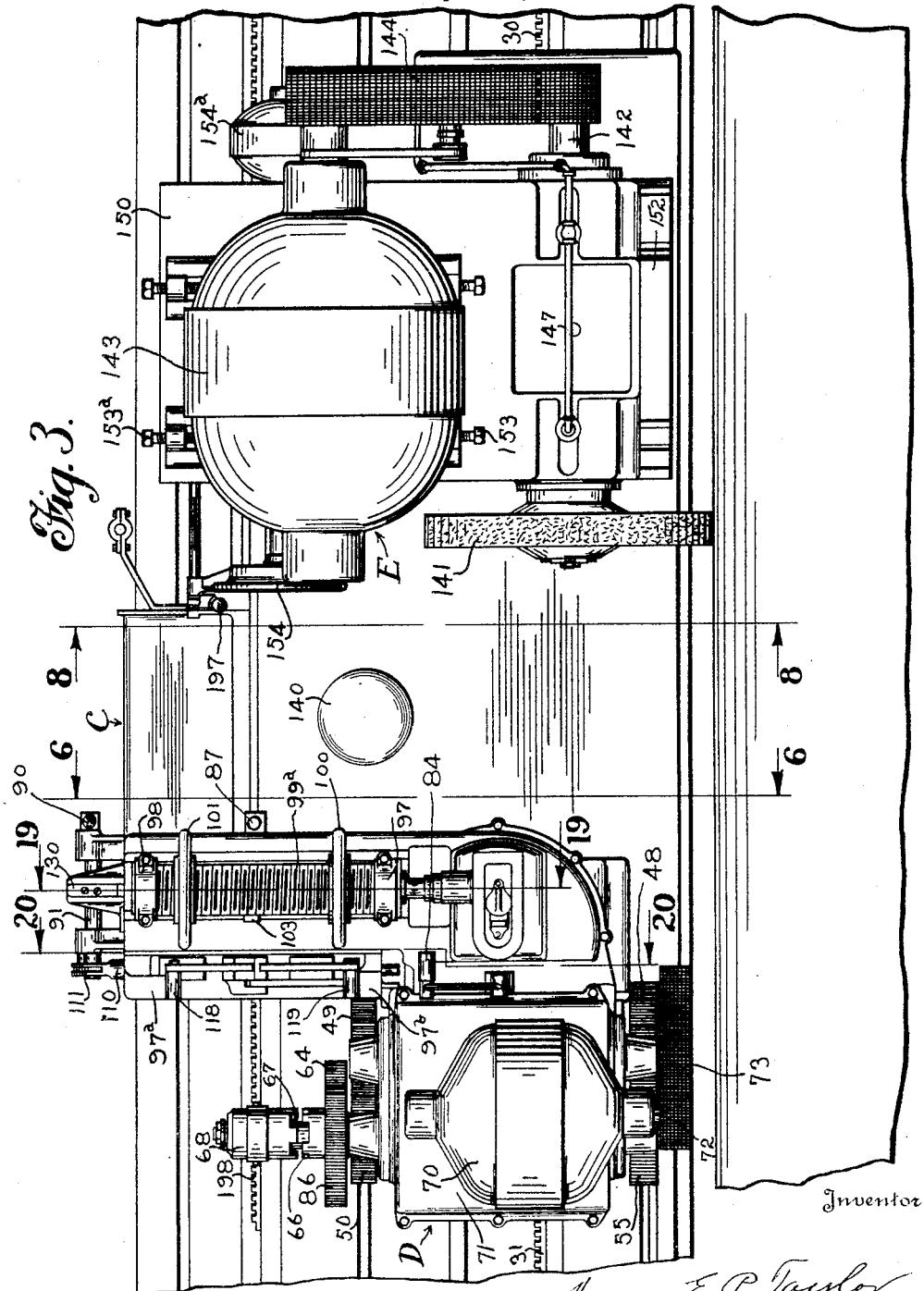

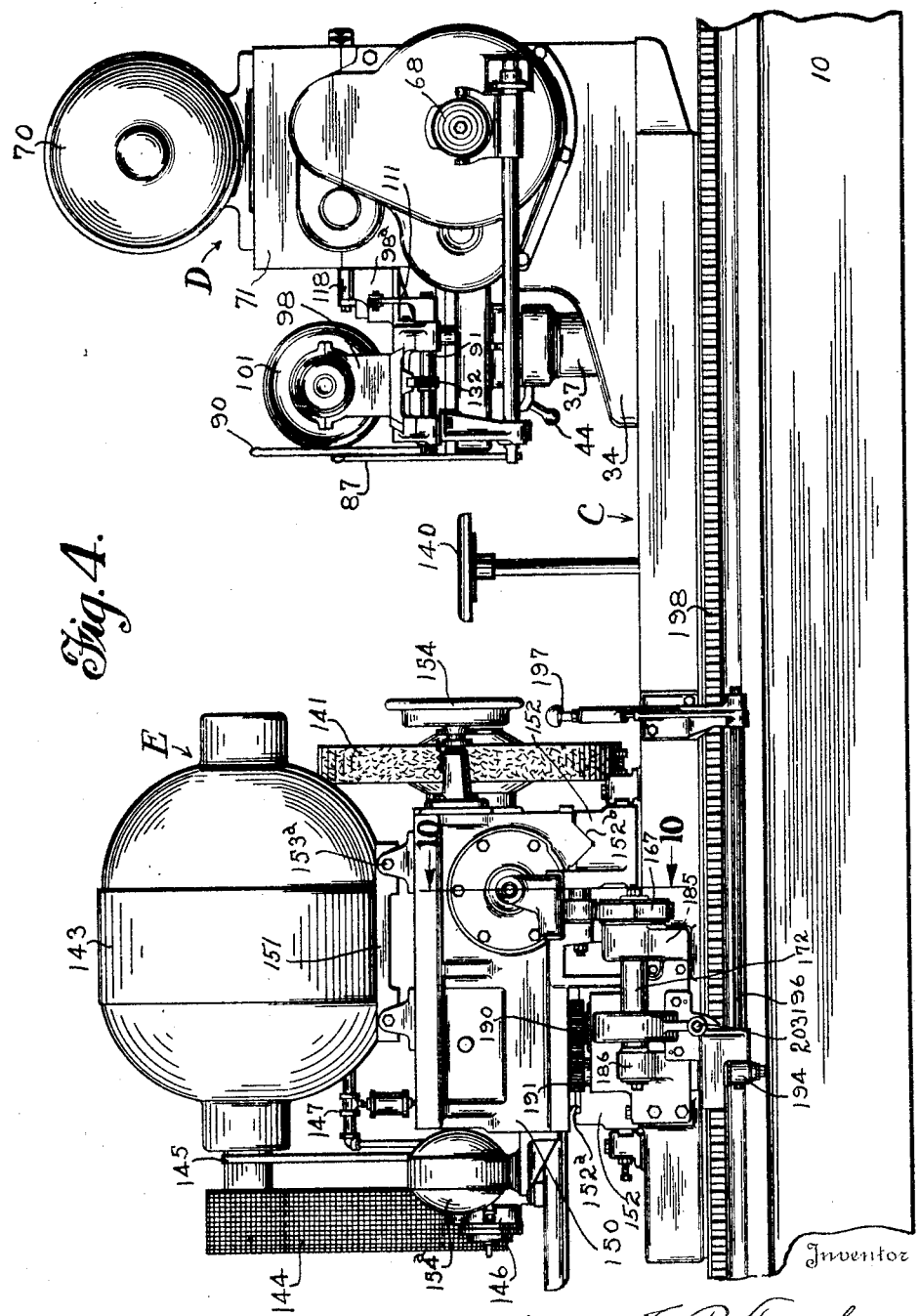

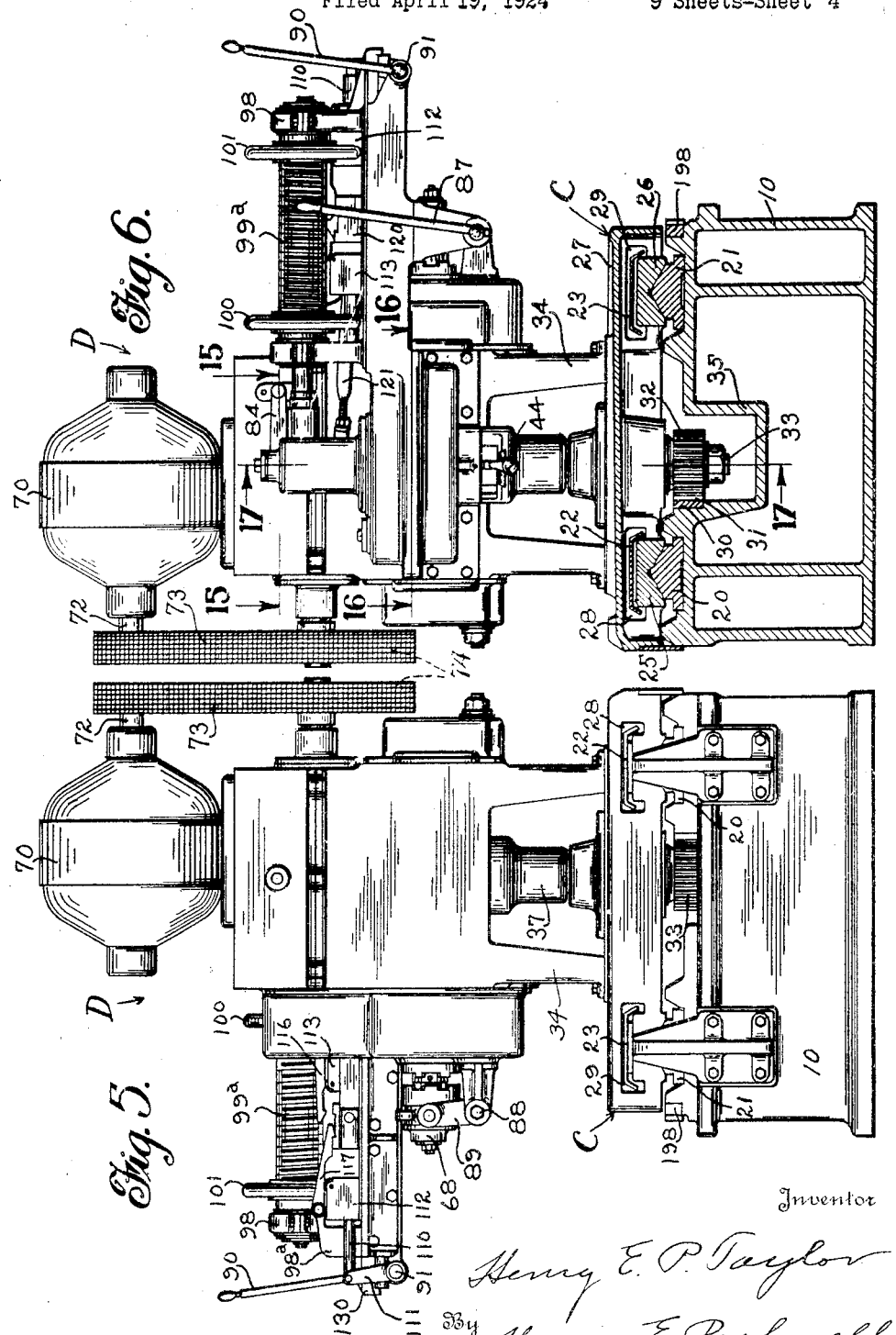

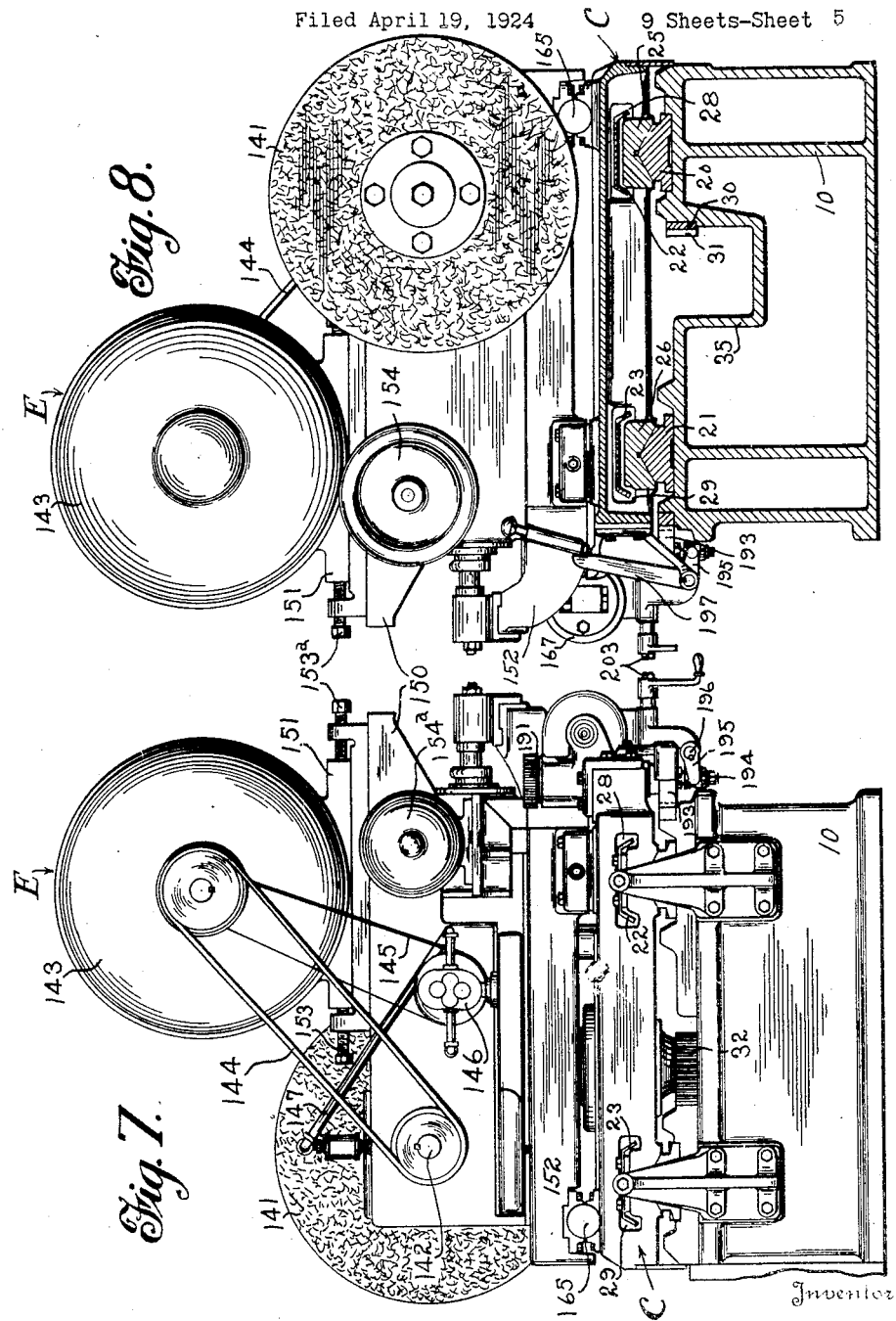

Jan. 29, 1929.
H. E. P. TAYLOR
1,700,422
ROLL GRINDER
Filed April 19, 1924
9 Sheets-Sheet 6
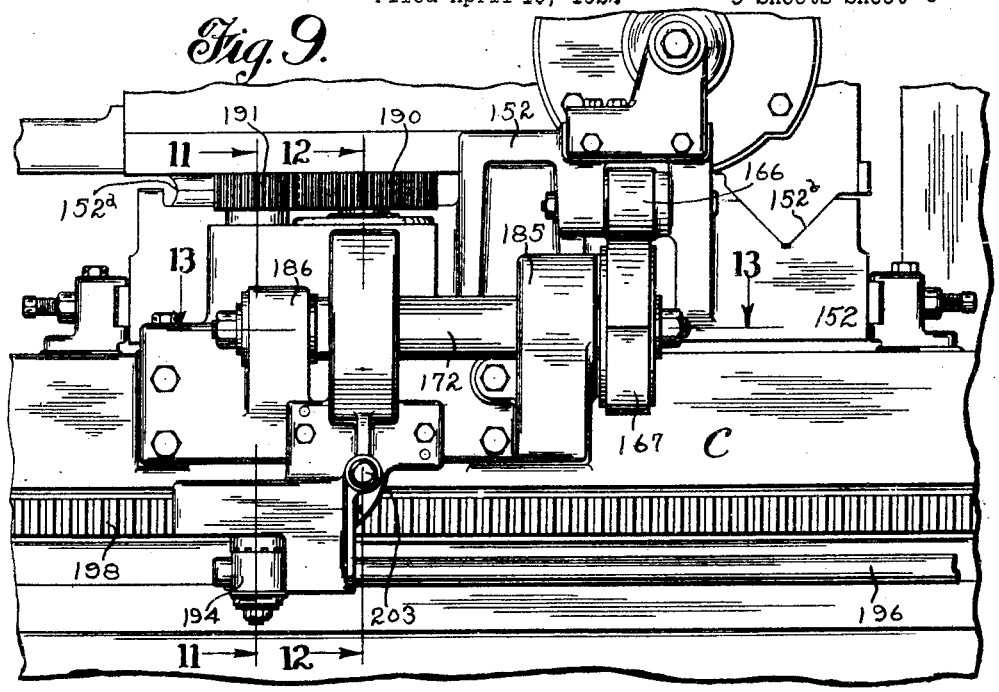
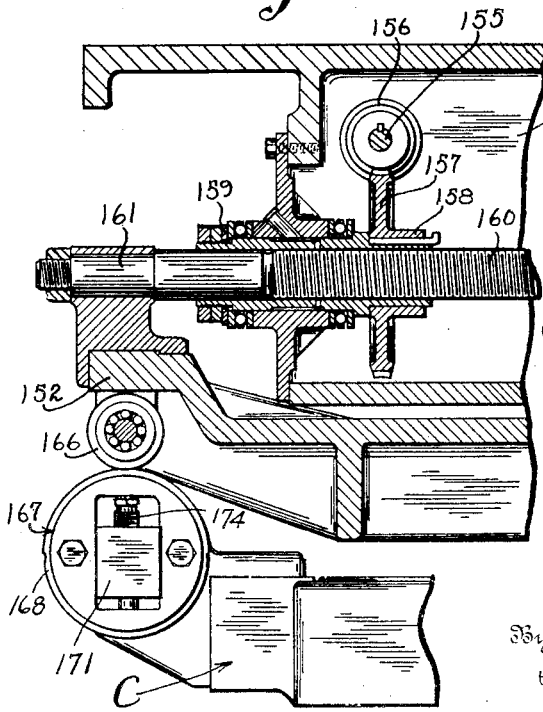
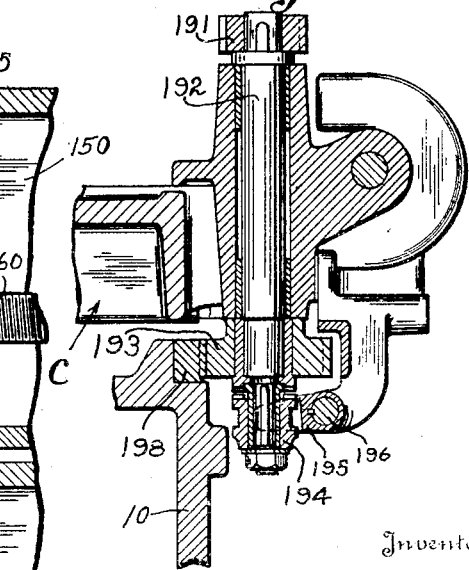
Inventor
Henry E. P. Taylor
By Henry E. Rockwell
Attorney

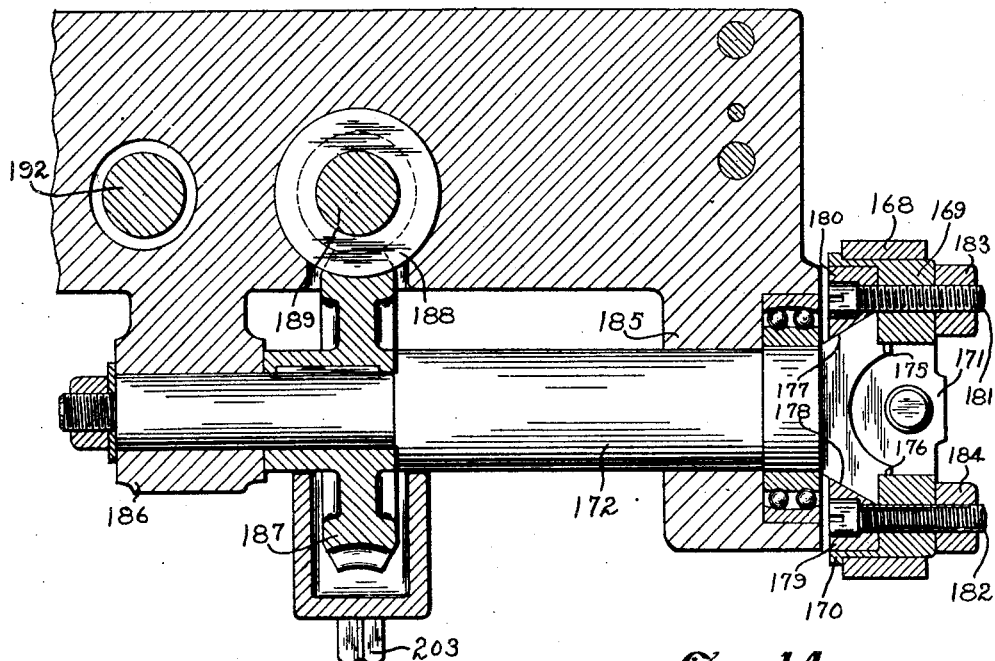
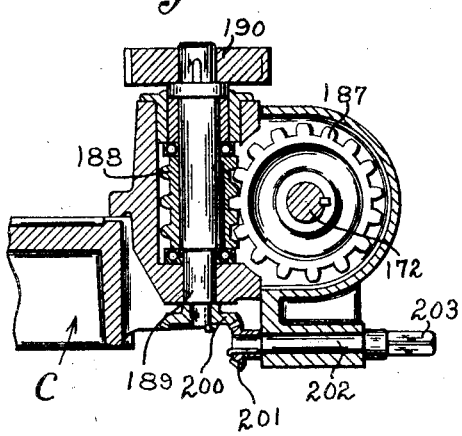
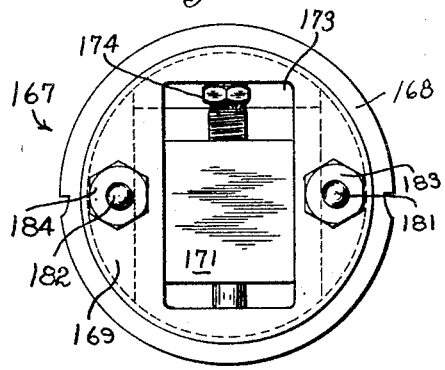

Jan. 29, 1929.                     1,700,422
H. E. P. TAYLOR
ROLL GRINDER
Filed April 19, 1924        9 Sheets-Sheet 8
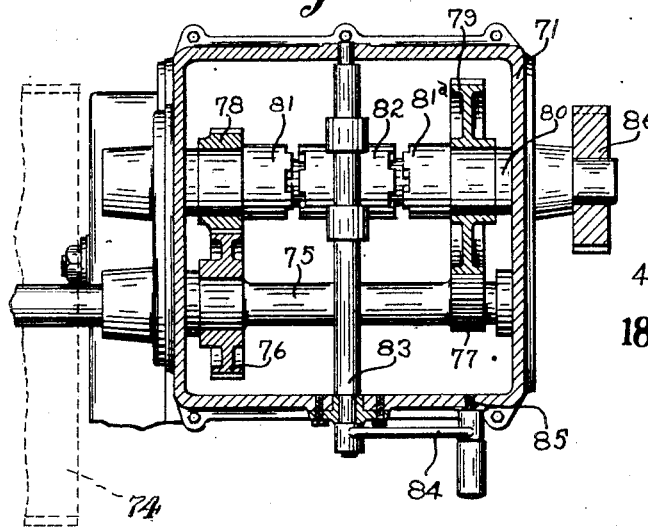
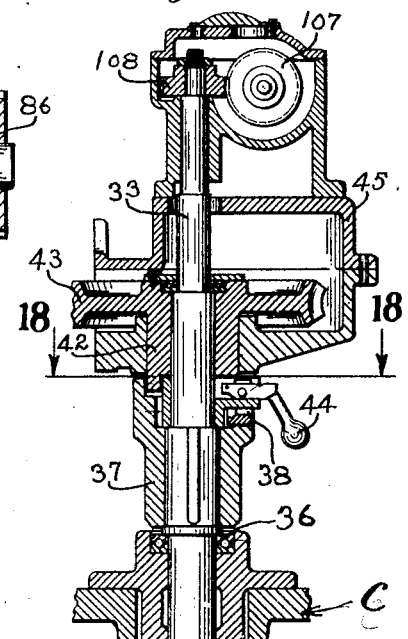
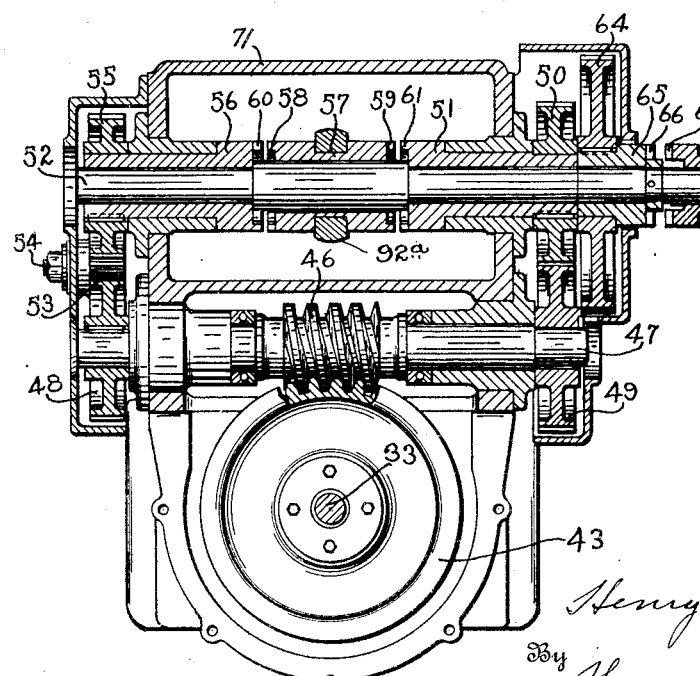
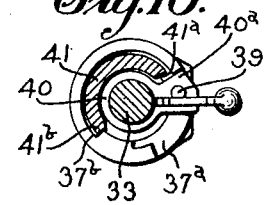
Inventor
Henry E. P. Taylor
By Henry E. Rockwell
Attorney Jan. 29, 1929.
H. E. P. TAYLOR
1,700,422
ROLL GRINDER
Filed April 19, 1924   9 Sheets-Sheet 9
Fig. 19.
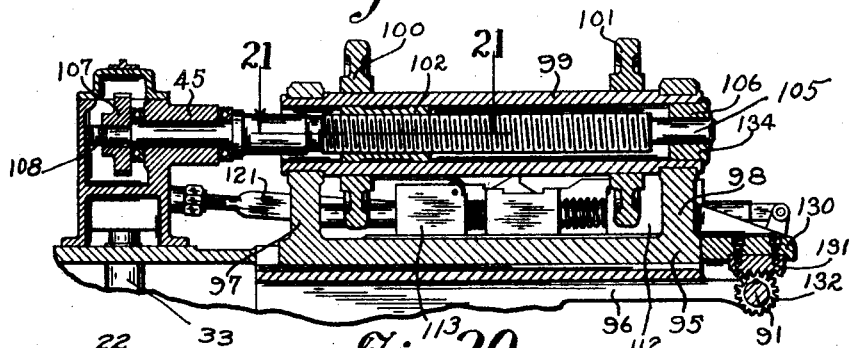
Fig. 20.
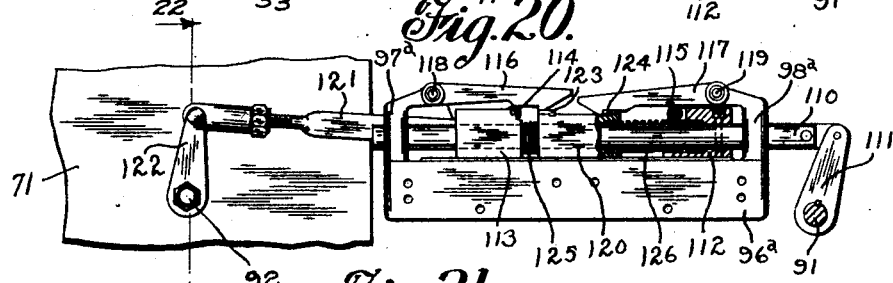
Fig. 21.
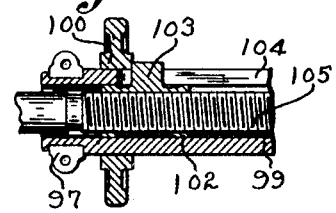
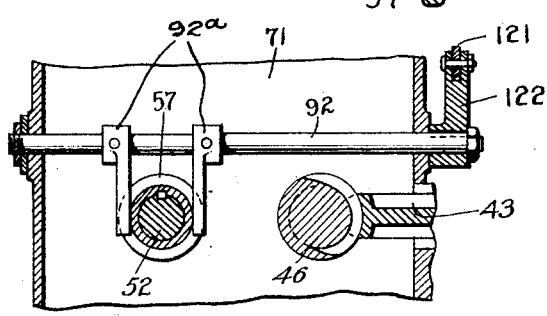
Fig. 22.
Inventor
Henry E. P. Taylor
By Henry E. Rockwell
Attorney Patented Jan. 29, 1929.

1,700,422

UNITED STATES PATENT OFFICE.

HENRY E. P. TAYLOR, OF SEYMOUR, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT.

ROLL GRINDER.

Application filed April 19, 1924. Serial No. 707,633.

This invention relates to roll grinding mechanism, and more particularly to that class of grinding mechanism which is employed in grinding rolls such as are used, for instance, in connection with rolling mills and calendering machines and other relatively heavy work, though the mechanism may be employed for grinding rolls of a different character and for a wide variety of uses.

In grinding heavy rolls of this character it is frequently desirable to grind them so that the surfaces will be either concave or convex, and it is desirable that the grinding machine be so constructed as to produce, not only a concave or a convex surface when desired, but also to produce, when desired, a roll having a true cylindrical surface.

One object of my invention is to provide a roll grinding machine such that rolls may be evenly cut or formed with the desired crown, or convexity or concavity of surface, the mechanism being readily adjustable for different degrees of crowning and being practically automatic in operation after adjustment.

A still further object of the invention is to provide a roll grinding machine capable of operating upon rolls varying in size between relatively wide limits, and with which truly cylindrical rolls may be formed as well as rolls having convex or concave surfaces.

Still another object of my invention is the provision of a machine of this character which may be more easily operated than prior machines, and may for this purpose have its various controls conveniently grouped so that they may be reached by the operator without the necessity of having to leave his seat.

To these and other ends the invention consists of the novel features and combination of parts to be hereinafter described and claimed.

In the accompanying drawings:

Fig. 1 is a top plan view of a roll grinding machine embodying my improvements;

Fig. 2 is a front elevational view of the machine;

Fig. 3 is an enlarged partial top plan view of the carriage;

Fig. 4 is a rear view of the reciprocating carriage and mechanism mounted thereon;

Fig. 5 is an end view of the machine bed and carriage with the carriage reciprocating mechanism mounted thereon;

Fig. 6 is a sectional view on line 6—6 of Fig. 3;

Fig. 7 is a view from the opposite end shown in Fig. 5 showing the bed and reciprocating carriage and grinding wheel mechanism mounted on the carriage;

Fig. 8 is a sectional view on line 8—8 of Fig. 3;

Fig. 9 is an enlarged rear view of the crowning mechanism;

Fig. 10 is a sectional view on line 10—10 of Fig. 4;

Fig. 11 is a sectional view on line 11—11 of Fig. 9;

Fig. 12 is a sectional view on line 12—12 of Fig. 9;

Fig. 13 is a sectional view on line 13—13 of Fig. 9;

Fig. 14 is an end view of the cam-wheel which controls the crowning operation;

Fig. 15 is a sectional view on line 15—15 of Fig. 6;

Fig. 16 is a sectional view on line 16—16 of Fig. 6;

Fig. 17 is a sectional view on line 17—17 of Fig. 6;

Fig. 18 is a sectional view on line 18—18 of Fig. 17;

Fig. 19 is a sectional view on line 19—19 of Fig. 3;

Fig. 20 is a sectional view on line 20—20 of Fig. 3;

Fig. 21 is a sectional view on line 21—21 of Fig. 19; and

Fig. 22 is a sectional view on line 22—22 of Fig. 20.

The particularly embodiment of my invention which I have selected to illustrate in the accompanying drawings, comprises a bed 10 which may be of any proper or suitable configuration or shape to properly support the various mechanisms of which the machine consists. The mechanism supported upon this bed may generally consist of a headstock A, a tailstock B, a reciprocating carriage C having mounted thereon the carriage operating and reversing mechanism D, and the grinding wheel operating mechanism E.

The headstock A, shown more particularly in Figs. 1 and 2, may comprise a face-plate 12 provided with the driving lugs 13 and roll centering pin 14, which may be rotated by a suitably mounted motor 15 through the driving chain 16. The tailstock B may comprise the rotatably mounted centering pin 17, and may be provided with the usual adjusting wheel 18 for adjusting the distance between the roll centering pins. It will be understood that the roll is set up between and supported by the headstock and tailstock, and suitably rotated by means of the driving-plate 12 driven in turn by the motor 15. This motor may be controlled in any desired manner, and in the usual practice is constantly in operation during the operation of the machine.

As shown in Fig. 1, the work supports just described, are mounted at one side of the bed. Upon the other side are arranged two slide-ways 20 and 21, upon which the main carriage is adapted to ride. Above these slide-ways may be arranged suitable guards 22 and 23 to protect the bearing surfaces of the ways from having foreign material lodged thereon, such as grit or dirt which may result from the grinding operation. The upper bearing surfaces of these ways, as shown more particularly in Fig. 6, are formed in the shape of an inverted V, and slidably mounted thereon by means of complementally shaped bearings 25 and 26 is a main carriage 27, which is adapted to be reciprocated upon the bed upon these ways, and which carries the operating mechanism both for imparting to it its reciprocating motion and for operating the grinding wheel. The carriage may be provided with openings 28 and 29 through which extend the guard-plates 22 and 23 which protect the slide-ways 20 and 21.

The carriage operating mechanism D is mounted upon the carriage adjacent one end thereof, as shown in Fig. 4, and comprises power mechanism for moving the carriage along the bed, and in addition automatically operating means for reversing the carriage at the end of its movement which causes it to reciprocate back and forth over the bed, and as will be pointed out hereinafter, to cause the grinding wheel to traverse the work in a back and forth movement.

Upon the bed 10 and extending longitudinally thereof below the main carriage is mounted a rack 30, the teeth 31 of which are designed to be engaged by a gear 32 upon a vertically extending shaft 33 mounted in suitable bearings in the frame 34 of the carriage operating mechanism D. The gear 32 as well as the lower end of the shaft 33 are adapted to move in a depression or channel 35 formed in the base below the carriage. As shown in Fig. 17, the shaft 33 upon which the gear 32 is rigidly secured, extends upwardly and is supported by a suitable thrust bearing 36. Above the thrust bearing a collar 37 is keyed to this shaft, and is provided upon its upper surface with a recess $37^a$ in which are a series of teeth 38 designed to be engaged by a pin 39 carried by a collar 40 rotatably mounted upon the shaft 33. The collar 40 is in driving engagement at all times through the pawl $40^a$ with one face $41^a$ of a depending shoulder 41 on the hub 42 of a worm-wheel 43, which hub and wheel are also loosely mounted upon the shaft 33. The pin 39 is adapted to be moved out of engagement with one of the teeth 38 by means of the lever 44, and thereupon engaged with another of the teeth upon the rotation of the collar so as to take up any lost motion which may appear in the train of gearing. The other edge $41^b$ of the depending shoulder on the hub 42 is adapted to engage a shoulder $37^b$ on the collar 37 to effect a reverse drive of the shaft by the worm-wheel 43.

The worm-wheel 43 is mounted within a suitable housing 45 and is engaged by the teeth of a worm 46 mounted upon a shaft 47 which extends horizontally and transversely of the carriage. This shaft 47 is provided upon its respective ends with gears 48 and 49, the gear 49 meshing with a gear 50 rigidly secured to a sleeve 51 loosely mounted upon a shaft 52 arranged parallel to the shaft 47. The gear 48 meshes with an idler gear 53 mounted upon a stud 54 supported by the housing, the gear 53 in turn meshing with a gear 55 secured to a sleeve 56 loosely mounted upon the shaft 52. Between the sleeves 51 and 56 is keyed to the shaft 52 a slidable clutch member 57 provided at its opposite ends with clutch faces 58 and 59, designed to engage corresponding clutch faces 60 and 61 on the sleeves 51 and 56. It will be apparent that the shaft 33 may be driven in opposite directions from the shaft 52, depending upon whether the clutch member 57 is in engagement with the sleeve 56 or the sleeve 51. The gear 50 secured to the sleeve 51 drives the shaft 47 through direct engagement with the gear 49, while the gear 55 upon the sleeve 56 drives the shaft 47 through the agency of the intervening idler gear 53.

Mounted loosely upon the shaft 52 is a gear 64, the gear being keyed to a collar 65 provided with a clutch face 66 designed to be engaged by the clutch face 67 upon a clutch collar 68 to clutch the gear 64 in driving engagement with the shaft 52, the collar 65 being loosely mounted on this shaft.

The gear 64 is designed to be driven from the carriage driving motor 70 by means of a two-speed gearing mounted in the housing 71, as shown in Fig. 15. The motor shaft 72 is provided with a sprocket-wheel about which is trained a sprocket-chain 73 which drives a sprocket 74 secured to the shaft 75. Secured to this shaft are two gears 76 and 77 meshing respectively with gears 78 and 79 loosely mounted upon a counter-shaft 80, the hubs of these gears being provided with clutch faces 81 and 81ª designed to be engaged by corresponding clutch faces at the opposite ends of the clutch collar 82. A rock-shaft 83 is journaled in the housing 71, and is connected to the sliding clutch collar 82, so that when this shaft is rocked by means of the crank or hand lever 84 the clutch collar 82 may be shifted to drive the shaft 80 either through the gears 76 and 78 or 77 and 79 as desired to effect the proper driving speed. The actuating lever 84 may be provided with a spring-pressed pin 85 designed to enter recesses in the housing to maintain it in adjusted positions. Upon the end of the shaft 80 is provided a gear 86 which meshes with the gear 64 so as to drive the shaft 52 through the clutch collar 68 from the motor.

A manually operable lever 87 is secured to a rock shaft 88 carrying a clutch shifting yoke 89, which controls the clutch collar 68 so that, when desired, the motor 70 may be cut off from the main carriage driving shaft 33. Likewise, a hand lever 90, shown more especially in Fig. 6, is secured to a shaft 91 which, through suitable mechanism shown in Fig. 20 and to be more particularly described hereinafter, is connected to a clutch shifting rock shaft 92 adapted to shift the reversing clutch 57 by means of the clutch shifting yoke 92ª in order to drive the shaft 33 in the proper direction.

The operation of the carriage driving mechanism heretofore described is as follows: The motor 70 through the sprocket chain 73 connected to the sprocket wheel 74 drives the shaft 75 which, through the two-speed mechanism shown in Fig. 15, drives the shaft 80 through the clutch 82. The gear 86 upon the shaft 80 being in mesh with the gear 64, the latter gear will be rotated and, through the clutch 68 controlled by the hand lever 87, drives the shaft 52 which, through the reversing clutch 57 and the selective gearing shown in Fig. 16, drives the shaft 47 either through the gears 55, 53 and 48 or the gears 50 and 49. The rotation of the shaft 47 upon which is mounted the worm 46 serves to rotate the worm wheel 43 which drives the shaft 33 through the end play take-up collar 40. The gear 32 at the lower end of the shaft 33 meshes with the rack 30 upon the bed and as this rack is stationary, the rotation of this gear and the shaft 33 causes the carriage "C" to be moved along the bed.

Automatic reversing mechanism for the carriage is provided which is capable of adjustment so that the movement of the carriage on the bed may be properly regulated to move the grinding wheel to the end of the work and cause it to begin its return movement at that point, regardless of the length of the roll being operated upon.

This reversing mechanism, shown more particularly in Figs. 19 and 21, comprises a base plate 95 slidably mounted upon a table 96 on the standard 34 which supports the carriage operating mechanism. At the ends of the base plate 95 are standards 97 and 98, upon which is mounted a sleeve or hollow cylinder 99 threaded upon its outer surface, as shown at 99ª in Figs. 5 and 6, and engaged with these threads are the reversing stop wheels 100 and 101. It will be understood that these wheels may be adjusted to any extent desired along the threaded surface of the sleeve 99 so as to determine the length of the path of travel of the carriage by determining the point at which it is reversed. Within the sleeve 99 is loosely and slidably mounted a nut 102, provided with a lug 103, which protrudes through a slot 104 in the sleeve 99 and, as shown in Fig. 21, is designed to contact with the stop wheels 100 and 101. The nut 102 is threadedly mounted upon a threaded shaft 105, journaled at one end in the sleeve at 106 and journaled at the other end in a part of the casing 45, where it is provided with a gear 107 which meshes with a gear 108 at the upper end of the shaft 33, as shown in Fig. 17. Passing loosely through standards 97ª and 98ª on a bracket 96ª secured to the table 96 is a shifting rod 110, having connected at one end thereof a rock arm 111 secured to the shaft 91. Secured upon the shifting rod 110 between the standards 97ª and 98ª are two shifting nuts 112 and 113, carrying between bifurcated portions thereof the camming rollers 114 and 115, which are designed to actuate the releasing pawls 116 and 117, pivoted to the standards at 118 and 119. Between the nuts 112 and 113, which are secured to the shaft 110, a shifting block 120 is loosely mounted upon this shaft, and to this block is connected a link 121 connected at its other end to a rock arm 122 secured to the shifting rock shaft 92. The block 120 is provided upon its upper side with lugs 123 and 124 adapted to be engaged by the pawls 116 and 117 to hold this block and the shifting shaft 92 in the desired position until the pawl is released by the co-operating camming roller secured to one of the nuts upon the shaft 110. Compression springs 125 and 126 are mounted upon the shaft 110 between the nuts 112 and 113 and the shifting block 120, so that, after one of the nuts has been moved toward the block, the latter will be shifted by one of these springs when the clutch teeth are in the proper position to engage. As will be understood, if a positive connection were arranged between the shaft 91 and the shifting shaft 92, damage to the mechanism would probably result.

The sliding plate 95 is provided at one end in Fig. 19 with a bracket 130 upon the lower side of which is secured a short rack 131 the teeth of which mesh with a pinion 132 upon the shaft 91, so that when the plate is shifted upon its support 96 the pinion 132 will be oscillated to actuate the shaft 91 and rock arm 111.

The operation of the automatic reversing mechanism is as follows:

The stop wheels 100 and 101 are first properly adjusted upon the threaded sleeve 99 so that the carriage will be reversed at the proper time during its travel upon the bed 10. The carriage driving shaft 33, being in operation whenever the carriage is in motion, drives the shaft 105 through the spiral gears 107 and 108. The nut 102 mounted upon the threaded portion of the shaft 105 will, therefore, be caused to travel along this shaft, as it is prevented from rotating due to the lug 103 disposed in the slot 104 in the sleeve. When this nut has traveled to the position shown in Figs. 19 and 21, the lug 103 contacts with the stop wheel 100 and the continued rotation of the shaft 105 carries the sleeve 99 together with the plate 95 to the left and through the rack 131, causes the rotation of the pinion 132. This causes the oscillation of the rock arm 111 mounted on the shaft 91 which effects the movement of the shifting rod 110. The nut 113 being secured to this rod is caused to move to the left and the camming roller 115 engaging the lower side of the pawl 117 moves this pawl out of engagement with the lug 124 on the shifting block 120. At the same time the spring 126 is compressed and the block 112 being also moved to the left, the tension on the spring 125 is relieved so that the shifting block 120 will be moved to the left by the spring 126 when the clutch teeth are in position to properly engage. The block 120 having been moved to the left, the pawl 116 will drop into engagement with the lug 123 so as to hold the block in position. The link 121 will likewise be moved to the left by the movement of the block 120 and will rock the clutch shifting shaft 92 through the rock arm 122 which accomplishes the movement of the reversing clutch collar 57 to reverse the direction of the shaft 47, and as has been explained, the direction of rotation of the gear 32 to cause the carriage to traverse the base in the opposite direction. The shaft 105 is slidably mounted at its right-hand end, as shown in Fig. 19, in a bearing block 106 in the sleeve 99, so that when the sleeve and table 95 are shifted as has been described, this movement will not interfere with the bearing of this end of the shaft 105.

When the shaft 33 is reversed in direction, it will also cause a reverse rotation of the shaft 105, which will in turn cause the nut 102 to travel in the opposite direction longitudinally of this shaft. When the nut reaches the right-hand end of the shaft 105, as shown in Fig. 19, the lug 103 contacts with the stop wheel 101 and causes the sleeve 99 and table 95 to be shifted to the right to oscillate the pinion 132 and shaft 91 in the opposite direction and shift the reversing clutch 57 to again reverse the direction of travel of the carriage.

The grinding wheel mechanism E is supported upon the end of the carriage opposite the carriage operating mechanism and between the two is a seat 140 for the operator. The grinding wheel is shown at 141 and is mounted upon a shaft 142 driven by a motor 143 through a suitable chain and sprocket connection 144. The motor shaft is also connected by a belt 145 to an oil pump 146 which through the pipe 147 delivers oil where needed to the bearings of the grinding wheel shaft. The grinding wheel and motor are suitably mounted upon a wheel base 150, the motor base 151 being disposed between adjusting screws 153 and 153$^a$ so that its position may be adjusted as desired. The grinding wheel base 150 is movably mounted upon a sub base 152 shown more particularly in Fig. 10 so that the wheel support may be moved transversely of the bed and of the carriage and relatively to the sub base to set the wheel up to the work or roll being ground. The sub base is provided for this purpose with the slideways 152$^a$ and 152$^b$ upon which complementally shaped bearing surfaces upon the wheel base are designed to rest. This movement of the wheel base is accomplished either through the hand-wheel 154 or the motor 154$^a$, both of which are connected to a shaft 155 (Fig. 10) upon which is keyed a worm 156 engaging a worm-wheel 157 upon a nut 158 rotatably mounted in bearings 159 in a part of the wheel base. The nut 158 is threaded internally and is engaged by the threaded portion 160 of a shaft 161 mounted in suitable bearings in the sub base 152 and extending transversely of the bed of the machine. It will be understood that when the shaft 155 is rotated either by the hand-wheel 153 or motor 154, the nut 158 will be turned, and because of its mounting in the wheel base and its threaded connection with the shaft 160 the wheel base and nut will be moved along the shaft to properly position the grinding wheel 140 relatively to the work.

In order to impart to the roll being ground the proper crown or the proper concavity or convexity in its surface, I have provided mechanism for automatically effecting approaching or receding movements between the grinding wheel and the work during the travel of the former. For this purpose, the sub base 152 is pivotally mounted near the edge adjacent the work upon the trunnion 165. At the opposite or rear side a roller 166 is mounted upon the wheel base and is designed to rest upon the surface of an adjustably mounted cam wheel 167, suitably supported by the carriage and oscillated synchronously with the movements of the carriage on the base, as will be hereinafter described.

The cam wheel 167 comprises a cam ring 168 of suitable wear resisting material secured to the periphery of a wheel 169 provided with a rearwardly extending circumferential flange 170 and adapted to be adjustably mounted upon the squared or rectangular end 171 of a shaft 172 rotatably mounted on the carriage (Figs. 4 and 13). The wheel 169 is provided with a rectangular opening 173 designed to receive the squared end 171 of the shaft, the wheel being adjustable vertically as shown in Fig. 14, by the rotation of the threaded stud 174 which passes through the end of the shaft and impinges at its ends against the edges of the rectangular opening in the wheel. The shaft 172 is provided with slideways 175 and 176 in which the opposite edges of the opening 173 of the wheel are slidably mounted and rearwardly of these ways the shaft is provided with the beveled sides 177 and 178 between which and the annular flange 170 upon the cam wheel are mounted beveled gibs 179 and 180. Bolts 181 and 182 are passed through these gibs and receive on their ends nuts 183 and 184 so that the cam wheel will be tightly locked in place against the shoulders of the slideways 175 and 176 of the shaft. It will be understood that when the nuts 183 and 184 are loosened and the threaded stud 174 rotated, the cam wheel 169 and cam ring 167 may be moved relatively to the axis of the shaft 172 so as to set the wheel eccentrically on the shaft.

The shaft 172 is mounted in suitable bearings 185 and 186 on the carriage and is provided with a worm-wheel 187 engaged by a worm 188 upon a vertical shaft 189 also mounted in suitable bearings on the carriage. At the upper end of the worm shaft is a change gear 190 meshing with a change gear 191 upon a parallel counter-shaft 192. A gear 193 is loosely mounted upon the lower end of the shaft 192 and is adapted to be clutched thereto by the clutch collar 194 operated by the shifting yoke 195 on the rock shaft 196, which is operated by the manually engagable clutch lever 197, shown in Fig. 4. The teeth of the gear 193 are in mesh with the teeth of a rack 198 mounted upon the main base, so that as the carriage travels upon the base, the gear 193 will be caused to rotate by its engagement with the teeth of the rack and due to the reciprocating movement of the carriage will obviously be rotated first in one direction and then in the other. At the lower end of the shaft 189, as shown in Fig. 12, is provided a gear 200 meshing with a gear 201 upon a shaft 202 provided with a squared end 203 for the application of a wrench, crank or the like, so that the position of the shaft 172 and cam wheel may be manually adjusted when the clutch collar 194 is thrown out of engagement to properly position the eccentric wheel relatively to the position of the carriage at the beginning of the grinding operation.

It will be obvious that the tilting of the sub base 152 upon the trunnion 165 will cause the grinding wheel 141 to move toward and recede from the roll being operated upon so as to form the desired crown upon the surface of the roll, or if the sub base is not tilted the roll will, of course, be ground with a truly cylindrical surface. As the carriage moves back and forth over the main base of the machine, the gear 193 engaging with the rack 198 effects the rotation of the shaft 192 which, through the change gears 191 and 190 and the worm 188, effects the oscillation of the shaft 172 upon which the cam wheel 167 is mounted. If this wheel is adjusted so that it is mounted eccentrically with respect to the axis of the shaft 172, it will obviously, due to its contact with the roller 166 as shown in Fig. 10, cause the sub base to tilt as it oscillates to and from the central position shown in this figure.

If it is desired to grind a roll with a concave surface the cam wheel 167 is adjusted upwardly as shown in Fig. 10, so that it causes the grinding wheel to tilt forwardly and downwardly toward the roll. When the proper adjustment is given the cam wheel the carriage is moved until the grinding wheel is at the center of the grinding roll. The clutch collar 194 is then moved to disengaging position and the operator by means of a wrench or crank upon the squared end 203 of the shaft 202, shown in Fig. 12, rotates the worm 188 to turn the shaft 172 so as to position the cam wheel 167 at its central or highest position, as shown in Fig. 10. This is the position where the grinding wheel will effect the deepest cut in the roll and which, of course, should be at the center of the roll. The clutch 194 is connected and the machine set into operation. As the carriage moves back and forth across the bed as heretofore explained, the cam wheel will be oscillated first in one direction and then in the other from its central position, the wheel passing this position as the grinding wheel passes the center of the roll. As the cam wheel is oscillated, the sub base 152 will be tilted upwardly as the wheel approaches its central position and then allowed to descend under its own weight so that the grinding wheel base will be tilted and cause the wheel to make a deeper cut at the center of the roll than at the ends so as to produce the proper concavity in the surface of the roll. It will be obvious that the cam wheel 167 may be adjusted for any degree of concavity desired.

If it is desired to grind a roll having a perfectly cylindrical surface, the cam wheel is placed in a position concentric with the shaft 172 so that during the oscillation of this wheel there will be no tilting movement imparted to the wheel base.

In a similar manner, if it is desired to grind a roll with a convex surface the center of the cam wheel will be placed below the center of the shaft 172 so that as the carriage approaches the central point of its path across the base, the sub base of the grinding wheel will be allowed to tilt rearwardly or away from the roll being ground, so as to remove a greater amount of material from the end of the roll than from the intermediate portion. It will be obvious that the operator upon the seat 140 is within easy reach of the reverse and clutch levers 90 and 87 and the change speed lever 84, the adjusting wheels 100 and 101, as well as the hand-wheel 154 for adjusting the wheel base transversely to feed the grinding wheel to the work and the clutch lever 197 so that all of the necessary controls are within easy and convenient reach.

It will also be obvious that once the machine is set in motion the operation will be substantially automatic until the grinding of a roll has been completed. The stop wheels 100 and 101, when properly adjusted upon the sleeve 99, will effect the reverse of the carriage operating mechanism so that the reverse movement of the carriage will take place at the proper time when the grinding wheel has completely traversed the roll. At the same time, the proper tilting movement will be imparted to the sub base of the grinding wheel to effect the proper crowning of the roll so that it will only be necessary for the operator to turn the hand wheel 154 so as to keep the grinding wheel in proper contact with the work as the grinding operation proceeds.

The provision of the change gears 190 and 191 allows for a variation in the speed of rotation of the disk or camming member, whereby the relation between the speed of rotation thereof and the reciprocating speed of the carriage may be altered. Such a change in the speed relation between these parts is desirable, for example, where the same amount of concavity is to be ground or formed upon the surface of two rolls of unequal length. In such an instance, the speed of rotation of the camming member would be slower when grinding the longer roll than when grinding the shorter one, the reciprocating speed of the carriage remaining the same in both cases.

I do not claim herein the inverted V-shaped ways, either alone or in combination with other structure in a grinding machine or the like, as the same forms the subject matter of a co-pending application of Albert A. Baker, Serial No. 734,754, filed August 28, 1924, Patent No. 1,669,504, granted May 15, 1928.

While I have shown and described a preferred embodiment of my invention, it will be understood that it is not to be limited to all the details shown but is capable of modification and variation within the spirit of the invention and within the scope of the appended claims.

What I claim is:—

1. In a grinding machine, a work support, a carriage, means for reciprocating said carriage relatively to the work carried by said support, a grinding wheel, a grinding wheel base upon which the wheel is mounted, a sub-base mounted upon the carriage and in turn supporting said wheel base, said wheel base being movable on the sub-base transversely relatively to the carriage, and said sub-base pivoted upon the carriage at a point adjacent the grinding wheel.

2. In a grinding machine, work supports, a carriage mounted to reciprocate relatively to said supports, an operator's seat provided at an intermediate portion of the carriage, mechanism mounted upon the carriage on one side of said operator's seat for effecting the reciprocation of the carriage, a sub-base pivotally mounted upon the carriage at the other side of the operator's seat, a grinding wheel support mounted upon said sub-base, a grinding wheel mounted on said support, said support being movable upon said sub-base in a direction transversely of the carriage toward and from the work support, means to tilt said sub-base relatively to said carriage controlling means for the reciprocating mechanism, controlling means for effecting the transverse movement of the grinding wheel support, controlling means for said tilting means, all of said controlling means being disposed adjacent the operator's seat so as to be accessible to the operator thereon.

3. In a grinding machine, work supports, a carriage mounted to reciprocate relatively to said supports, means for reciprocating said carriage, a grinding wheel mounted on said carriage to tilt toward and from the work carried by the supports, and means for tilting said grinding wheel during the reciprocation of the carriage comprising a rotatable adjustable cam member, said member being arranged to oscillate synchronously with the reciprocation of the carriage.

4. In a grinding machine, work supports, a carriage mounted to reciprocate relatively to said supports, means for reciprocating said carriage, a grinding wheel mounted on said carriage to tilt toward and from the work carried by the supports, and means for tilting said grinding wheel during the reciprocation of the carriage comprising a rotatable adjustably mounted camming member located beneath and directly supporting the grinding wheel mounting, and means to oscillate said camming member during the reciprocation of the carriage.

5. In a grinding machine, work supports, a carriage mounted to reciprocate relatively to said supports, means for reciprocating said carriage, a grinding wheel mounted on said carriage to tilt toward and from the work carried by the supports, means for tilting said grinding wheel during the reciprocation of the carriage comprising an eccentrically mounted rotatable camming member adjustable in relation to the grinding wheel and means for oscillating said member during the reciprocation of the carriage.

6. In a grinding machine, work supports, a carriage mounted to reciprocate relatively to said supports, means for reciprocating said carriage, a grinding wheel mounted on the carriage to tilt toward and from the work carried by the supports, means for tilting said grinding wheel comprising a shaft oscillated synchronously with the reciprocation of the carriage, and a rotatable camming wheel mounted on said shaft and means to adjust said camming wheel transversely to the axis of said shaft.

7. In a grinding machine, work supports, a carriage mounted to reciprocate relatively to said supports, means for reciprocating said carriage, a grinding wheel mounted on the carriage to tilt toward and from the work carried by the supports, means for tilting said grinding wheel comprising a shaft oscillated synchronously with the reciprocation of the carriage, slideways provided upon the end of said shaft, and a camming wheel mounted in said slideways for adjustment transversely of the shaft axis.

8. In a grinding machine, work supports, a carriage mounted to reciprocate relatively to said supports, means for reciprocating said carriage, a grinding wheel mounted on the carriage to tilt toward and from the work carried by the supports, means for tilting said grinding wheel comprising a shaft oscillated synchronously with the reciprocation of the carriage, said shaft being provided with a rectangular end portion and a camming wheel having an opening to receive said end portion and being mounted thereon for adjustment transversely of the axis of the shaft.

9. In a grinding machine, work supports, a carriage mounted to reciprocate relatively to said supports, means for reciprocating said carriage, a grinding wheel supported on said carriage to tilt toward and from the work carried by said supports, means for tilting said grinding wheel comprising a camming member eccentrically arranged on the carriage, means for oscillating said member synchronously with the reciprocation of the carriage, means on the grinding wheel support resting freely upon said camming member to impart a tilting motion to the former from the latter, and means for varying the position of said camming member relatively to its mounting to thereby control the contour of the work.

10. In a grinding machine, a work support, a carriage, means for reciprocating said carriage relatively to the work carried by said support, a grinding wheel, a grinding wheel base upon which the wheel is mounted, a sub-base mounted upon the carriage and in turn supporting said wheel base, said wheel base being transversely movable relatively to the carriage, and said sub-base being pivoted upon the carriage, means for tilting said sub-base about its pivot, comprising a camming member eccentrically mounted upon the carriage and oscillated through the reciprocation thereof, means to vary the eccentricity of said camming member relatively to said carriage, and a follower upon the sub-base resting upon the periphery of said camming member.

11. In a grinding machine, a work support, a carriage, means for reciprocating said carriage relatively to the work carried by said support, a sub-base pivotally mounted upon the carriage to rock about an axis adjacent one edge thereof, a wheel base mounted on the sub-base for movement transversely of the carriage, a grinding wheel mounted upon said wheel base adjacent that edge of the carriage at which the sub-base is pivoted, and means for rocking said sub-base comprising a shaft mounted on the carriage and oscillated synchronously with the reciprocation thereof, a camming wheel mounted on said shaft and a follower on said sub-base engaging said wheel.

12. In a roll grinding machine, a roll support, a carriage, means to move said carriage back and forth relatively to a roll carried by said supports, means to automatically effect the reciprocation of the carriage, a grinding wheel, a base upon which said wheel is carried, said base being mounted to move transversely of the carriage and to tilt about an axis extending longitudinally thereof, means mounted upon said base to rotate the grinding wheel, means to effect the tilting of the base comprising a shaft mounted on said carriage and oscillated synchronously with the reciprocation thereof, a cam wheel eccentrically mounted on said shaft, and means for adjusting the eccentricity of said cam wheel.

13. In a roll grinding machine, a main base, work supports mounted on said base, a carriage movably mounted on the base, means for effecting movement of the carriage relatively thereto, automatically acting means for effecting the reciprocation of the carriage, a grinding wheel, a grinding wheel base mounted on said carriage for tilting movement toward and from the work carried in said supports, and means for engaging said base to tilt the same including a vertical shaft mounted on the carriage, a rack mounted on the base, a pinion rotatably carried by said vertical shaft and engaged with the teeth of said rack to effect the rotation of the pinion when the carriage is reciprocated, a horizontally disposed shaft mounted on the carriage and arranged to be rotated by the rotation of said pinion, and a cam wheel eccentrically mounted on said horizontally disposed shaft and disposed in position to engage said base.

14. In a roll grinding machine, a main base, work supports mounted on said base, a carriage movably mounted on the base, means for effecting movement of the carriage relatively thereto, automatically acting means for effecting the reciprocation of the carriage, said moving means and said automatically acting means being mounted on said carriage, a grinding wheel, a grinding wheel base mounted on said carriage for tilting movement toward and from the work carried in said supports, and means for tilting said base including a shaft mounted on the carriage, a rack mounted on the base, a pinion rotatably carried by the carriage and engaged with the teeth of said rack to effect the rotation of the pinion when the carriage is reciprocated, a shaft mounted on the carriage and arranged to be oscillated by the rotation of said pinion, and a cam wheel eccentrically and movably mounted on said shaft.

15. In a grinding machine, a bed, means for supporting the work to be operated upon, a carriage slidably supported upon the bed adjacent the work supports, power means for reciprocating the carriage mounted thereupon including means for automatically reversing the movement of the carriage, and means for driving the carriage at a plurality of speeds, a grinding wheel support mounted on the carriage, a grinding wheel on said support, and an electric motor mounted on the grinding wheel support for rotating the wheel.

16. In a grinding machine, a bed, means for supporting the work to be operated upon, a carriage slidably supported upon the bed, carriage operating mechanism, supported on the bed including a power source, a change speed mechanism, means for reversing the movement of the carriage and a grinding wheel support mounted on the carriage, a grinding wheel on said support, an electric motor mounted on said wheel support for rotating the wheel, and means mounted on the carriage for tilting said wheel support toward and from the work.

17. In a grinding machine, a bed, means for supporting the work to be operated upon, a carriage slidably supported upon the bed, carriage operating mechanism supported on the bed, comprising a power source, a change speed mechanism, and means for reversing the movement of the carriage, a grinding wheel support mounted on the carriage, a grinding wheel on said support, an electric motor mounted on said wheel support for rotating the wheel, and power operable means for feeding the grinding wheel toward the work transversely of the bed.

18. In a grinding machine, a bed, means for supporting the work to be operated upon, a carriage slidably supported upon the bed, carriage operating mechanism supported on the bed comprising a power source, a change speed mechanism, and means for reversing the movement of the carriage, a grinding wheel support mounted on the carriage, a grinding wheel on said support, an electric motor mounted on said wheel support for rotating the wheel, means for tilting said wheel support toward and from the work, and power operable means for feeding the grinding wheel toward the work transversely of the bed mounted upon said wheel support.

19. A grinding machine comprising a bed, a carriage slidably mounted on the bed, reversing means for causing reciprocation of said carriage in either direction comprising a shaft rotated when the carriage is moved and control means actuated by the rotation of this shaft.

20. A grinding machine comprising a bed, a carriage slidably mounted on the bed, means for driving said carriage, reversing means for said driving means, a shaft rotated when the carriage is moved and in synchronism therewith, and control means for said reversing means actuated by the rotation of said shaft to set said reversing means into operation.

21. A grinding machine comprising a bed, a carriage slidably mounted on the bed, means for driving said carriage, reversing means for said driving means, a shaft rotated when the carriage is moved, control means for said reversing means actuated by the rotation of said shaft to set said reversing means into operation at a predetermined point in the travel of the carriage.

22. A grinding machine comprising a bed, a carriage slidably mounted on the bed, means for driving said carriage, reversing means for said driving means, a shaft rotated when the carriage is moved, adjustable stops associated with said reversing means adapted to be set to define the length of the path of travel of the carriage, and control means actuated by said rotatable shaft to engage said stops and set the reversing means into operation.

23. A grinding machine comprising a bed, a carriage slidably mounted on the bed, means for driving said carriage, reversing means for said driving means, a shaft rotated when the carriage is moved, a slotted sleeve associated with said reversing means, a pair of stops adjustably mounted on said sleeve, and a traveling block within the sleeve and controlled by the rotation of said shaft to engage said stops and set the reversing mechanism into operation.

24. A roll grinding machine comprising a bed, a carriage slidably mounted on the bed, driving means for the carriage, reversing means for said driving means, and means to automatically set said reversing means into operation, comprising a rock shaft, a member slidably mounted on said carriage and engaged with said rock shaft to actuate the same, means to shift said slidable member, a link connected to said rock shaft, a pair of springs adapted to be compressed by movement of said link, and means positioned between said springs and operated thereby, said means being connected to said reversing means.

25. A roll grinding machine, comprising a bed, a carriage slidably mounted on the bed, driving means for said carriage mounted thereon, reversing means for said driving means, and means for actuating said reversing means, comprising a rock shaft, automatic means for rocking said shaft at a predetermined time in the travel of the carriage, a link connected to said rock shaft, a pair of blocks secured to said link in spaced relation, a third block slidably mounted on said link and connected to the reversing means, and compression springs mounted between said slidably mounted block and said secured blocks.

26. A roll grinding machine comprising a bed, a carriage slidably mounted on the bed, driving means for said carriage mounted thereon, reversing means for said driving means, and means for actuating said reversing means comprising a rock shaft, automatic means for rocking said shaft at a predetermined time in the travel of the carriage, a link connected to said rockshaft, a pair of blocks secured to said link in spaced relation, a third block slidably mounted on said link and connected to the reversing means, compression springs mounted between said slidably mounted block and said secured blocks, and means for holding said slidably mounted block in adjusted position.

27. In a grinding machine, a carriage, means for reciprocating said carriage, a sub-base extending transversely of said carriage and pivoted thereto at one end thereof, a grinding wheel support slidably mounted upon said sub-base, a grinding wheel rotatably mounted upon said support, an electric motor arranged to drive said grinding wheel mounted upon said support, and means operated by the movement of said carriage to raise and to allow the lowering of the unconnected end of said sub-base to move the grinding wheel toward and away from said carriage.

28. In a grinding machine, a carriage, means to reciprocate said carriage, a sub-base, one end of said sub-base being pivotally supported by said carriage adjacent one side thereof, a grinding wheel support mounted upon said sub-base for sliding movement transversely to said carriage, and means engaging the other end of said sub-base to support the same, said means being adapted to raise and to allow the lowering of the engaged end of said sub-base during the reciprocation of said carriage.

29. In a grinding machine, a work support, a carriage, means for reciprocating said carriage relatively to the work carried by said support, a sub-base having one end pivotally connected to the side of said carriage adjacent the work support, a grinding wheel support mounted upon said sub-base and arranged thereon for sliding movement toward and away from said work support, means to support the other end of said sub-base comprising a rotatable disk mounted upon said carriage and engaging the last mentioned end of said sub-base, and means to rotate said disk.

30. In a grinding machine, a work support, a carriage, means for reciprocating said carriage relatively to the work carried by said support, a sub-base having one end pivotally connected to the side of said carriage adjacent the work support, a grinding wheel support mounted upon said sub-base and arranged thereon for sliding movement toward and away from said work support, means to support the other end of said sub-base comprising a rotatable disk mounted upon said carriage and engaging the last mentioned end of said sub-base, and means to rotate said disk, said last named means being operable by the reciprocating movement of said carriage.

31. In a grinding machine, a work support, a carriage, means for reciprocating said carriage relatively to the work carried by said support, a sub-base having one end pivotally connected to the side of said carriage adjacent the work support, a grinding wheel support mounted upon said sub-base and arranged thereon for sliding movement toward and away from said work support, means to support the other end of said sub-base comprising a rotatable disk mounted upon said carriage and engaging the last mentioned end of said sub-base, and means to rotate said disk, said last named means being operable by the reciprocating movement of said carriage, and comprising a shaft upon which said disk is mounted, and a change gear train whereby the speed of rotation of said disk may be varied.

32. In a grinding machine, a work support, a carriage, means for reciprocating said carriage relatively to the work carried by said support, a sub-base having a portion thereof pivotally connected to the side of said carriage adjacent the work support, a grinding wheel support mounted upon said sub-base, means to support another portion of said sub-base comprising a shaft mounted upon said carriage, a disk secured upon an end of said shaft and engaging said sub-base at the last mentioned portion thereof, a train of gears in driving arrangement with said shaft, and cooperating means between said gears and the bed of said machine whereby the reciprocating movement of said carriage rotates said disk.

33. In a grinding machine, a work support, a carriage, means for reciprocating said carriage relatively to the work carried by said support, a sub-base having a portion thereof pivotally connected to the side of said carriage adjacent the work support, a grinding wheel support mounted upon said sub-base, means to support another portion of said sub-base comprising a shaft mounted upon said carriage, a disk mounted upon an end of said shaft and arranged to be eccentrically adjusted relatively thereto, the periphery of said disk engaging said sub-base at the last mentioned portion thereof, and means to rotate said disk including an arrangement of gears operable by the reciprocation of said carriage.

34. In a grinding machine, a reciprocable carriage, a grinding wheel, a grinding wheel base upon which the wheel is mounted, a sub-base pivotally mounted upon the carriage and in turn supporting said wheel base.

35. In a grinding machine, a reciprocable carriage, a sub-base having a portion thereof pivoted to an adjacent longitudinal side of said carriage, a grinding wheel support mounted upon said sub-base, means to support another portion of said sub-base comprising a rotatable disk mounted upon said carriage and engaging the last mentioned portion of said sub-base, and means to rotate said disk.

36. In a grinding machine, a reciprocable carriage, a sub-base having a portion thereof pivoted to an adjacent longitudinal side of said carriage, a grinding wheel support mounted upon said sub-base, means to support another portion of said sub-base comprising a rotatable disk mounted upon said carriage and engaging the last mentioned portion of said sub-base, and means to rotate said disk, said last named means being operable by the reciprocating movement of said carriage.

37. In a grinding machine, a reciprocable carriage, a sub-base having a portion thereof pivoted to an adjacent longitudinal side of said carriage, a grinding wheel support mounted upon said sub-base, means to support another portion of said sub-base comprising a rotatable disk mounted upon said carriage and engaging the last mentioned portion of said sub-base, and means to rotate said disk, said last named means being operable by the reciprocating movement of said carriage, and comprising a shaft upon which said disk is mounted, and a change gear train whereby the speed of rotation of said disk may be varied.

38. In a grinding machine, a reciprocable carriage, a sub-base having a part thereof pivoted to an adjacent longitudinal side of said carriage, a grinding wheel support mounted upon said sub-base, means to support another part of said sub-base comprising a shaft mounted upon said carriage, a disk secured upon an end of said shaft and engaging said sub-base at the last mentioned part thereof, a train of gears in driving arrangement with said shaft, and cooperating means between said gears and the bed of said machine whereby the reciprocating movement of said carriage will rotate said disk.

39. In a grinding machine, a reciprocable carriage, a sub-base having one end pivoted to an adjacent longitudinal side of said carriage, a grinding wheel support mounted upon said sub-base, means to support the other end of said sub-base comprising a shaft mounted upon said carriage, a disk mounted upon an end of said shaft and arranged to be eccentrically adjusted relatively thereto, the periphery of said disk engaging said sub-base at the last mentioned end thereof, and means to rotate said disk including an arrangement of gears operable by the reciprocation of said carriage.

40. In a grinding machine, a reciprocating carriage, a grinding wheel mounted on the carriage to tilt toward and from work carried by adjacent supports, means for tilting said grinding wheel comprising a shaft oscillated synchronously with the reciprocation of the carriage, said shaft being provided with a rectangular end portion and a camming wheel having an opening to receive said end portion and being mounted thereon for adjustment transversely of the axis of the shaft.

41. In a grinding machine, a reciprocating carriage, a grinding wheel supported on said carriage, means for tilting said grinding wheel comprising a camming member eccentrically arranged on the carriage, means for oscillating said member synchronously with the reciprocation of the carriage, means on the grinding wheel support resting freely upon said camming member to impart a tilting motion to the former from the latter, and means for feeding the grinding wheel transversely without disturbing the position of the camming member on the carriage.

42. In a grinding machine, a bed having a longitudinally extending runway, a carriage slidably mounted upon said runway, a rack extending longitudinally of said bed, a pinion engaging said rack, means on said carriage for rotating said pinion, another rack extending longitudinally of said bed, a sub-base pivotally mounted at one end thereof to said carriage adjacent a longitudinally extending side thereof, a grinding wheel support slidably mounted upon said sub-base for movement transversely relatively to said carriage, a rotatable disk mounted adjacent the other side of said carriage and engaging the free end of said sub-base, and means carried by said carriage, in operable connection with said disk and in engagement with said last named rack whereby said disk is rotated in synchronism with the rotation of said pinion.

43. In a grinding machine, a longitudinally extending member, another member extending transversely of and having one end thereof pivoted to one side of said first mentioned member, a grinding wheel support slidably mounted upon said second mentioned member, a rotatable disk-like member mounted upon said first mentioned member upon a supporting member adjacent the free end of said second mentioned member, said disk-like member being adapted to support the free end of said second mentioned member upon the periphery thereof, and means to move said disk-like member relatively to the axis of the support therefor whereby a rocking motion will be imparted to said second mentioned member when said disk-like member is rotated.

44. In a grinding machine wherein a grinding wheel support is slidably mounted upon a sub-base, which is turn is pivotally supported at one end thereof to a reciprocable carriage, a rotatable member supported upon said carriage and adapted to engage the free end of the sub-base, said member being provided with a convex periphery, a support for said member having a portion upon which said member is mounted, and means to move said member transversely relatively to said support whereby a rocking motion is imparted to the sub-base when said member is rotated.

45. In a grinding machine, a bed, a reciprocable carriage slidingly mounted upon said bed, a sub-base having an end thereof pivoted to an adjacent longitudinal side of said carriage, a grinding wheel support slidably mounted upon said sub-base, means to tilt said sub-base relatively to said carriage comprising a rotatable member mounted upon said carriage and in supporting engagement with the free end of said sub-base, and means to rotate said member, including a shaft member, cooperating means between said bed and said shaft member whereby the shaft member is operated by the reciprocating movement of said carriage, and means to engage and disengage said cooperating means.

46. In combination with a grinding machine having a grinding wheel supporting structure adapted to be tilted to carry the wheel toward and away from the work to be ground, a stationary work support, a carriage on which said wheel supporting structure is mounted, means for reciprocating the carriage, a rockable member having a curved surface adapted to engage said wheel supporting structure to tilt the same, said surface being adjustable relatively to the grinding wheel supporting structure, and means providing for the rocking of said member at a plurality of different speeds relatively to the carriage speed.

47. In combination with a grinding machine having a grinding wheel supporting structure adapted to be tilted to carry the wheel toward and away from the work to be ground, a rotatable disk adapted to engage said wheel supporting structure to tilt the same, means to rotate said disk, means for adjusting said disk toward and away from the grinding wheel supporting structure to vary the contour of the work, and means providing for the rotation of said disk at a plurality of different speeds.

48. In combination with a grinding machine having a grinding wheel supporting structure adapted to be tilted to carry the wheel toward and away from the work to be ground, a stationary work support, a carriage on which said wheel supporting structure is mounted, means for reciprocating the carriage, a rotatable disk adapted to tilt said wheel supporting structure, and means providing for the rotation of said disk at a plurality of different speeds relatively to the carriage speed, and means for setting said disk at varying degrees of eccentricity relatively to its mounting.

49. In combination with a grinding machine having a work support and a grinding wheel supporting structure, and wherein said work support and said wheel supporting structure are reciprocable with respect to each other, said wheel supporting structure being adapted for tilting movement toward and away from said work support, a movable member having a camming surface adapted to engage said wheel supporting structure to tilt the same, means to move said member operably by the aforesaid reciprocable movement, means for feeding the grinding wheel transversely independently of said movable camming member; and means providing a variation in the speed of the movement of said member.

50. In combination with a grinding machine having a grinding wheel supporting structure adapted to be tilted to carry the wheel toward and away from the work to be ground, a rockable member having a curved surface upon its periphery, said member being adapted to engage upon the curved peripheral surface thereof, said wheel supporting structure to tilt the same, means to adjust said rockable member toward and away from the grinding wheel supporting structure, and means to rock said member, including a rotatable pinion, a shaft upon which said member is mounted and a set of change gears interposed between said pinion and said shaft whereby the speed of the movement of said member may be varied.

51. In combination with a grinding machine, wherein a reciprocating carriage having supporting means for a grinding wheel tiltably secured thereto is provided, means engaging said wheel supporting means to tilt the same, said means comprising a rotatably and adjustably mounted disk, and means to rotate said disk including a pinion rotatable by the reciprocation of said carriage, and a set of change gears interconnecting said pinion and said disk whereby the speed relation between the reciprocation of said carriage and the rotation of said disk may be varied.

52. In a grinding machine, a work support, a grinding wheel tiltably mounted with respect to said work support, whereby said wheel is adapted to be swung toward and away therefrom, and means to produce the aforesaid movement of said wheel, including a rotatable pinion, a rotatable shaft, and a disklike member mounted upon said shaft and adapted to be adjusted relatively to the axis of said shaft in various degrees of eccentricity whereby the amount of the aforesaid wheel movement will be varied.

53. In a grinding machine, a work support, a grinding wheel, means to support said wheel with respect to said work support whereby said wheel is tiltable toward and away from said work support, means to operate said first mentioned means, including a rotatable pinion, a disk operable by said pinion and having the periphery thereof in engagement with a part of said first mentioned means, and means to raise and lower the axis of said disk whereby the amount of movement of said first mentioned means will be varied.

54. In a grinding machine, a work support, a grinding wheel, means to support said wheel with respect to said work support whereby said wheel is tiltable toward and away from said work support, and means to operate said first mentioned means, including a rotatable pinion, a shaft actuated by said pinion, a camming member on said shaft having the periphery thereof in engagement with a part of said first mentioned means, and means to offset the periphery of said camming member with respect to the axis of said shaft whereby the amount of movement of said first mentioned means will be varied.

55. In a grinding machine, a work support, a grinding wheel pivotally supported relative to said work support, means to swing said wheel toward and away from said work support about the pivot, said means comprising a disk, a follower operatively associated with said wheel and resting upon the periphery of said disk, means to rotate said disk, and means to vary the relation between the periphery of said disk and the pivot about which said wheel is adapted to swing whereby the amount of swinging movement of said grinding wheel will be varied.

56. In a grinding machine, a work support, a grinding wheel, said grinding wheel being mounted to swing toward and away from said work support, a pivot supporting said grinding wheel for the aforesaid swinging movement, and means also supporting said grinding wheel adapted to produce the aforesaid swinging movement, said means including a rotatable shaft having a disk mounted thereon and operable thereby, and means to affect the relative position of said disk on said shaft whereby it will be eccentric to the axis thereof.

57. In a grinding machine, a work support, a carriage, means for reciprocating said carriage relatively to the work carried by said support, a sub base pivotally mounted upon said carriage adjacent the work carried by said support, a wheel base mounted upon said sub base and slidable thereon transversely with respect to the direction of the reciprocating movement of said carriage, and a grinding wheel rotatably mounted on said wheel base.

58. In a grinding machine, a work support, a carriage, means for reciprocating said carriage relatively to the work carried by said support, a sub base pivotally mounted upon said carriage adjacent the work carried by said support, a wheel base mounted upon said sub base and slidable thereon transversely with respect to the direction of the reciprocating movement of said carriage, and a grinding wheel rotatably mounted on said wheel base, and means to rock said sub base to tilt said grinding wheel toward the work in said work support, comprising a member having a curved surface engaged by said sub base, said member being movable in synchronism with the reciprocating carriage.

59. In a grinding machine, a work support, a grinding wheel mounted upon a part of said machine, means to cause a relative reciprocating movement between said work support and said grinding wheel, and means to move said grinding wheel toward and away from the work in said work support during the reciprocating movement between said parts, comprising a rotatable member having a part of its periphery concentric to its center and operable to move said grinding wheel, and means to move said member transversely with respect to the axis of the rotation thereof to cause its center to be eccentric to such axis.

60. In a grinding machine, a work support, a grinding wheel mounted upon a part of said machine for swinging movement toward and away from the work in said work support, means to cause a relative reciprocating movement between said work support and said grinding wheel, and means to swing said grinding wheel toward and away from the longitudinal axis of the work in said work support in synchronism with and during the reciprocating movement between said parts, comprising a rotatable disk-like member having a part of its periphery adapted to tilt said grinding wheel, the wheel tilting part of the periphery of said member being concentric to its center, and means to adjust said member to cause its center to be eccentric to the axis of the rotation thereof.

61. In a grinding machine, a grinding wheel support mounted for reciprocating movement on said machine, means for tilting said grinding wheel support, comprising a disk-like member mounted for turning movement either eccentrically or concentrically of said member, means for oscillating said member synchronously with the reciprocation of said wheel support, and means on said grinding wheel support freely engaging the periphery of said member whereby a tilting motion is imparted to the former from the latter.

In witness whereof, I have hereunto set my hand this 16th day of April, 1924.

HENRY E. P. TAYLOR.